J. Mitchell,
Fan Blower.

Nº 82,736. Patented Oct. 6, 1868.

Witnesses:
J. E. M. Bowen
W. H. Bristow

Inventor
James Mitchell
Per Knight Bro.
Attorneys

United States Patent Office.

JAMES MITCHELL, OF PHILADELPHIA, PENNSYLVANIA.

Letters Patent No. 82,736, dated October 6, 1868.

IMPROVEMENT IN ROTARY BLOWERS.

The Schedule referred to in these Letters Patent and making part of the same.

TO ALL WHOM IT MAY CONCERN:

Be it known that I, JAMES MITCHELL, of Philadelphia, in the county of Philadelphia, and State of Pennsylvania, have invented a new and improved Rotary Fan or Blower; and I do hereby declare the following to be a full, clear, and exact description of the same, reference being had to the accompanying drawings, which are made a part of this specification.

Similar letters of reference indicate corresponding parts in both views.

Figure 1:
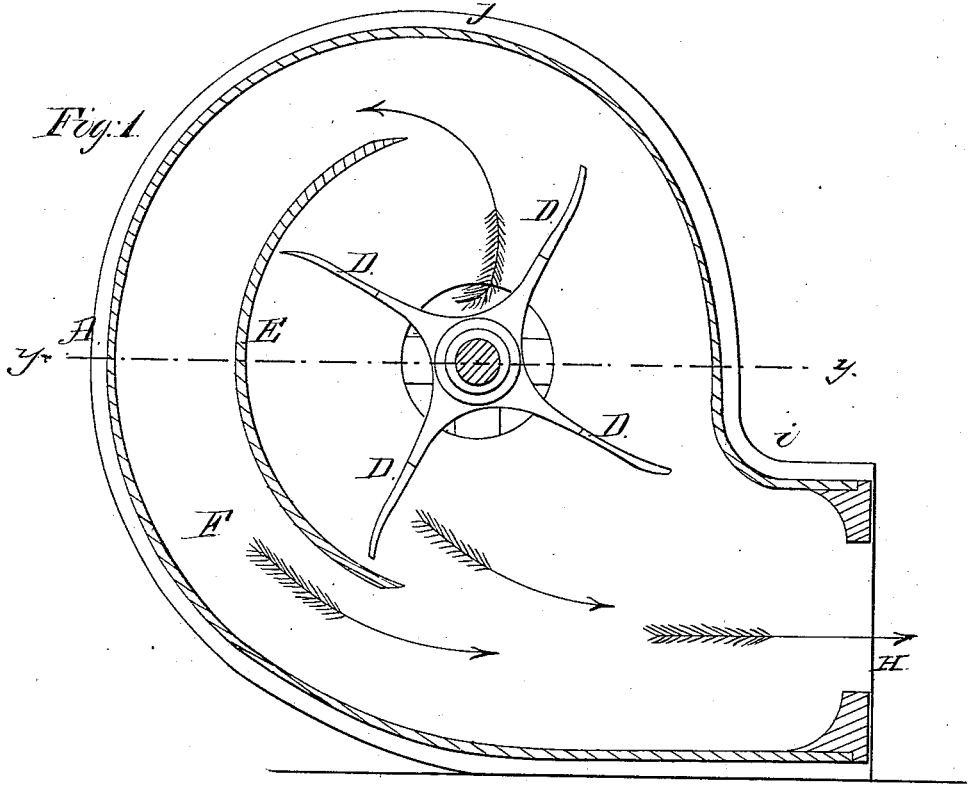
Figure 1 represents a transverse section at $x\ x$, fig. 2, of a rotary fan illustrating my invention.
Figure 2:
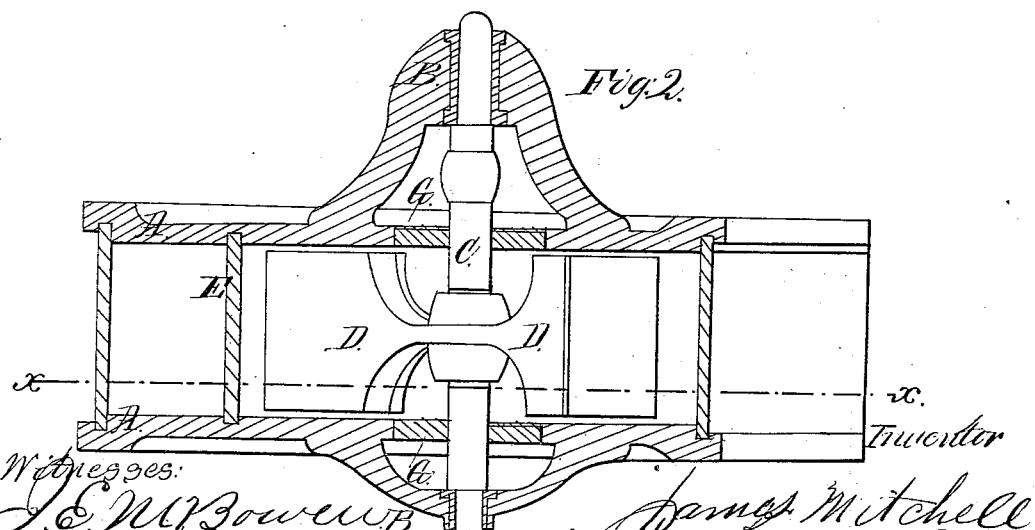
Figure 2 is a longitudinal section thereof at $y\ y$, fig. 1.

The object of my invention is to increase the blowing-capacity of a rotary fan, and this I accomplish by providing an auxiliary air-passage, so located within the fan-case as to receive and conduct the blast from the wings, at that part of their rotation where, without such auxiliary air-passage, they would be comparatively ineffective.

In the drawings—

A represents a casing, which may be, externally, of common form. B B are bearings for the shaft C of a fan, D D D D, which is journalled eccentrically within the casing A. E represents a curved wall or partition, extending from head to head of the casing, in a form and position concentric to the shaft C, and sufficiently distant therefrom to permit the free passage of the wings D, in their rotation. Between the partition E and the external casing A is my auxiliary air-passage, F.

Operation.

The air is admitted, in the usual manner, through induction-openings, G G, in the centres of the cylinder-heads, and discharged tangentially at H. All the air that is moved by the wings in passing from $i$ to $j$, (fig. 1,) is driven tangentially into the auxiliary air-passage F, and by it conveyed freely to the discharge-port H. I am thus enabled to make the rotary wings effective at that part of their rotation where, in fans of ordinary construction, they produce little or no beneficial effect, and this I do without impairing their action as they approach the tangential discharge-port H, which is the part of the rotation where the effective labor of the common rotary fan is performed.

Having thus described my invention, what I claim as new therein, and desire to secure by Letters Patent, is—

The combination of the direct tangential discharge-port H, rotary fan D, eccentric casing A, and concentric partition E, all constructed and arranged as herein represented and described, for the purpose specified.

JAMES MITCHELL.

Witnesses:
WALLACE FLETCHER,
JOSHUA S. FLETCHER.